(12) United States Patent
Dudar et al.

(10) Patent No.: US 9,051,905 B2
(45) Date of Patent: Jun. 9, 2015

(54) EVAPORATIVE EMISSION CONTROL SYSTEM

(71) Applicant: FORD GLOBAL TECHNOLOGIES, LLC, Deadborn, MI (US)

(72) Inventors: Aed M Dudar, Canton, MI (US); Robert Roy Jentz, Westland, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 158 days.

(21) Appl. No.: 13/858,087

(22) Filed: Apr. 7, 2013

(65) Prior Publication Data

US 2014/0303830 A1    Oct. 9, 2014

(51) Int. Cl.
*F02M 25/08* (2006.01)
*G01M 3/26* (2006.01)
*G01M 3/32* (2006.01)

(52) U.S. Cl.
CPC ............ *F02M 25/0809* (2013.01); *F02M 25/08* (2013.01); *G01M 3/26* (2013.01); *F02M 25/0836* (2013.01); *G01M 3/3236* (2013.01); *G01M 3/3263* (2013.01); *F02M 25/0818* (2013.01); *F02M 25/089* (2013.01); *F02M 25/0872* (2013.01)

(58) Field of Classification Search
CPC .......... F02M 25/0809; F02M 25/0818; F02M 25/0836; F02M 25/0872; F02M 25/089; F02M 25/08; G01M 3/26; G01M 3/3236; G01M 3/3263

USPC .......... 701/29.1, 33.9, 34.4; 702/51; 123/516, 123/518, 519; 73/40.5 R, 114.39, 40, 49, 73/114.38, 40.7
See application file for complete search history.

(56) References Cited

U.S. PATENT DOCUMENTS

| | | | |
|---|---|---|---|
| 5,606,121 A * | 2/1997 | Blomquist et al. .......... | 73/114.39 |
| 6,276,343 B1 * | 8/2001 | Kawamura et al. ........... | 123/520 |
| 6,363,921 B1 * | 4/2002 | Cook et al. .................... | 123/520 |
| 2004/0237630 A1 * | 12/2004 | Cook et al. ........................ | 73/40 |
| 2009/0277251 A1 * | 11/2009 | Takakura ....................... | 73/40.7 |

* cited by examiner

*Primary Examiner* — Russell Frejd
(74) *Attorney, Agent, or Firm* — Joseph E. Root

(57) ABSTRACT

A combined system for detecting leaks in an evaporative emission control system and for inflating flat tires. The evaporative emission control system includes a vapor capture canister with a purge valve and a system pressure sensor, and the flat tire repair kit includes a reservoir containing tire inflation fluid, an attachment tube for attaching the reservoir to a tire, and a pump selectively connected to the evaporative emission control system and the reservoir. A controller is configured to perform the following actions: initiate a leak detection sequence by pressurizing the evaporative emission control system, and then performing a leak detection operation by measuring the pressure within the evaporative emission control system over time. A tire pressure monitoring system may be provided, allowing the pump to be switched between performing evaporative system testing and inflating a flat tire.

18 Claims, 4 Drawing Sheets

EVAPORATIVE EMISSION CONTROL SYSTEM

TECHNICAL FIELD

This disclosure relates generally to evaporative emission control systems in vehicles, and, more particularly, to evaporative emission control system diagnostics.

BACKGROUND

The present disclosure brings together two problems dealing with automobiles. The first issue concerns testing for leaks in an automotive evaporative emission control system. Gasoline in an automobile fuel tank evaporates over time, releasing vapors of volatile organic compounds. Apart from wasting fuel, evaporation may lead to malfunctions or in some cases, even an explosion, and in any event volatile organic compound vapors can be important pollutants. To prevent these occurrences, automotive vehicles are equipped with evaporative emission control systems which prevent the vapors from escaping.

Evaporative emission control systems are designed to capture and store gasoline vapor emissions during normal vehicle operation. The same system also captures gasoline vapors during refueling. Contemporary vehicles include onboard diagnostics, a vehicle's self-diagnostic and reporting capability which check and report on a number of vehicle subsystems, providing results accessible by the vehicle owner or a repair technician. Within this general category, fuel leaks may be addressed by a process referred to as leak diagnostics.

One method for performing leak diagnostics, the engine-off-natural-vacuum method, takes advantage of the fact that negative pressure is created when heated fuel cools. Thus, one may measure air pressure within the evaporative emission control system after the engine has been stopped for a time, identifying a leak if negative pressure does not occur. This method has limited effectiveness on hybrid vehicles, however. Because such vehicles have limited engine run times they reject minimal heat into the fuel tank, in turn minimizing the pressure buildup within the evaporative emission control system. Unable to employ the cool-down test, hybrid vehicles typically utilize expensive vacuum pumps to supply negative pressure for performing leak diagnostics.

A second problem involves flat tires. Traditionally, one addressed this problem by removing the flat tire and replacing it with the spare tire. As tire quality improved, reducing the instances of flat tires, automobile manufacturers began replacing the spare tire with a special, short-duty tire to be used only long enough to reach a service station. More recently, an expanding foam was introduced that could be injected into a flat tire. The expanding foam would both inflate the tire and plug the leak. Such products are readily available to consumers in the form of dispenser cans, such as the FIX-A-FLAT foam provided by Pennzoil and widely available in auto-parts stores.

Recently, automobile manufacturers have taken the next step, dispensing with a spare tire altogether in favor of the expanding foam. The foam is typically provided by the manufacturer as part of a flat tire repair kit, including an air pump and a dispensing can for the expanding foam. This unit is provided with the automobile by the manufacturer, and it usually remains within its specially provided storage location in the vehicle itself to deal with the rare emergency of a flat tire. Because such occurrences are rare, the flat tire repair kit may never be used at all throughout the life of the vehicle.

Accordingly, it can be seen that a need remains for an emission control system that accurately performs leak diagnostics in a cost-effective manner.

SUMMARY

An aspect of the present disclosure provides a combined evaporative emission control system leak detection and tire inflation system for an automotive vehicle having an internal combustion engine and a fuel tank. The evaporative emission control system includes a canister, in fluid communication with the fuel tank and with the engine; a canister purge valve (CPV), interposed in a communication line between the canister and an intake manifold of the engine; and a pressure sensor, positioned to sense vapor pressure in the evaporative emission control system. The flat tire repair kit includes a reservoir containing a tire inflation fluid; an attachment tube extending from a reservoir and adapted for connection to a vehicle tire; and a pump in fluid communication with the evaporative emission control system and the reservoir. Operation of these components is controlled by a controller, which is configured to initiate a leak detection sequence, prep pressurize the evaporative emission control system, measure the evaporative emission control system pressure over a selected period of time, and, upon a determination that the evaporative emission control system pressure falls below a preselected threshold within a preselected time, provide a warning of a possible evaporative emission control system leak.

Another aspect of the present disclosure provides a combined evaporative emission control system leak detection and tire inflation system for an automotive vehicle having an internal combustion engine and a fuel tank. The evaporative emission control system includes a canister, in fluid communication with the fuel tank and with the engine; a canister purge valve (CPV), interposed in a communication line between the canister and an intake manifold of the engine; and a pressure sensor, positioned to sense vapor pressure in the evaporative emission control system. The flat tire repair kit includes a reservoir containing a tire inflation fluid; an attachment tube extending from a reservoir and adapted for connection to a vehicle tire; and a portable pump detachably in fluid communication with the evaporative emission control system and the reservoir. Operation of these components is controlled by a controller, which is configured to pressurize the evaporative emission control system, measure the evaporative emission control system pressure over a selected period of time and to cease operations when a leak is detected in the evaporative emission control system.

Yet another aspect of the present disclosure provides a system for an automotive vehicle. This system includes an evaporative emission control system, which in turn includes a canister, in fluid communication with the fuel tank and with the engine; a canister purge valve (CPV), interposed in a communication line between the canister and an intake manifold of the engine; and a pressure sensor, positioned to sense vapor pressure in the evaporative emission control system. A flat tire repair kit includes a reservoir containing a tire inflation fluid; an attachment tube extending from a reservoir and adapted for connection to a vehicle tire; and a pump in fluid communication with the a tire on the vehicle. Operation of these components is controlled by a controller, which is configured to initiate a leak detection sequence, pressurize the evaporative emission control system, and then measure the evaporative emission control system pressure over a selected period of time. Upon a determination that the evaporative emission control system pressure falls below a preselected threshold within a preselected time, the controller may provide a warning of a possible leak in the evaporative emission control system. The system further includes a tire pressure monitoring system connected to the flat tire repair kit. The pump in is fluid communication with the evaporative emission control system, the reservoir, or the tire pressure monitoring system, and the pump is configured to switch over to at least one of the evaporative emission control system, the reservoir, or the tire pressure monitoring system.

These and other aspects of the embodiments will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF THE DRAWINGS

The figures described below set out and illustrate a number of exemplary embodiments of the disclosure. Throughout the drawings, like reference numerals refer identical or functionally similar elements. The drawings are illustrative in nature and not drawn to scale.

DETAILED DESCRIPTION

The following detailed description is made with reference to the Figures. Exemplary embodiments are described to illustrate the subject matter of the disclosure, not to limit its scope, which is defined solely by the appended claims.

The system disclosed here performs leak diagnostics in a cost-effective manner, while also providing for tire repair. The illustrated embodiments achieve this result by using a pump which is part of the flat tire repair kit to pressurize the emission control system to accurately perform leak diagnostics. Then the pump is turned off, the emission control system is sealed, and the system is analyzed for leaks. Upon the occurrence of a flat tire, the pump and associated elements of the flat tire kit are employed to inflate the tire and plug the leak using an expanding foam, pumped into the tire by the pump.

Figure 1:
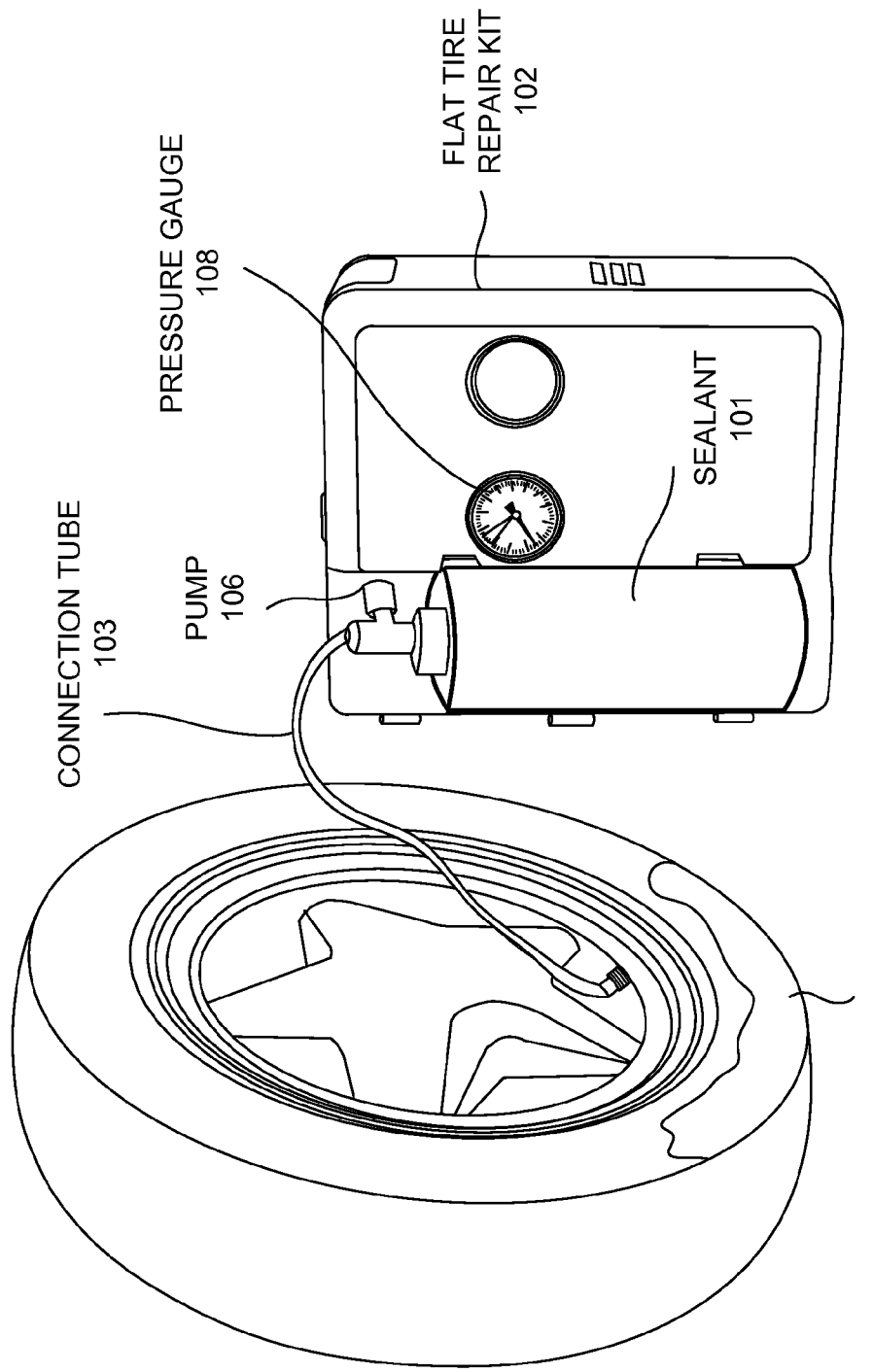
FIG. 1 illustrates a conventional flat tire repair kit.

FIG. 1 illustrates a conventional flat tire repair kit 102. This kit includes a pump 106 and a sealant can 101 contained in a unitary package that can be stored in anticipation of a flat tire. Pump 106 is a simple compressor, delivering air to the can of sealant can 101 at sufficient pressure to deliver sealant into the tire. The compressor includes a 12V motor (not shown), chosen to operate from the automobile's 12V DC power system. As will be seen in more detail below, the pump can be permanently wired into the power system, or it can connect into that system using a convenient cigarette lighter plug. The sealant can be chosen from among the numerous products available and known to those in the art, such as the FIX A FLAT product noted above. Sufficient sealant may be provided to inflate one or more flat tires, in one embodiment, the sealant can 101 contains about 24 ounces of aerosol sealant.

To re-inflate a flat tire 104, pump 106 connects with the tire 104 employing a connection tube 103 extending from the can to the tire's air fitting. Pump 106 is activated, and pumping sealant from the sealant can 101 through the connection tube 103 into tire 104. A pressure gauge 108 may be provided to check the tire pressure during inflation to avoid over pressurization. In some embodiments, flat tire repair kit 102 can re-inflate a flat tire in about 7-10 minutes. This technique maintains the tire's shape and allows the driver proceed to a service station at a reduced speed.

Figure 2:
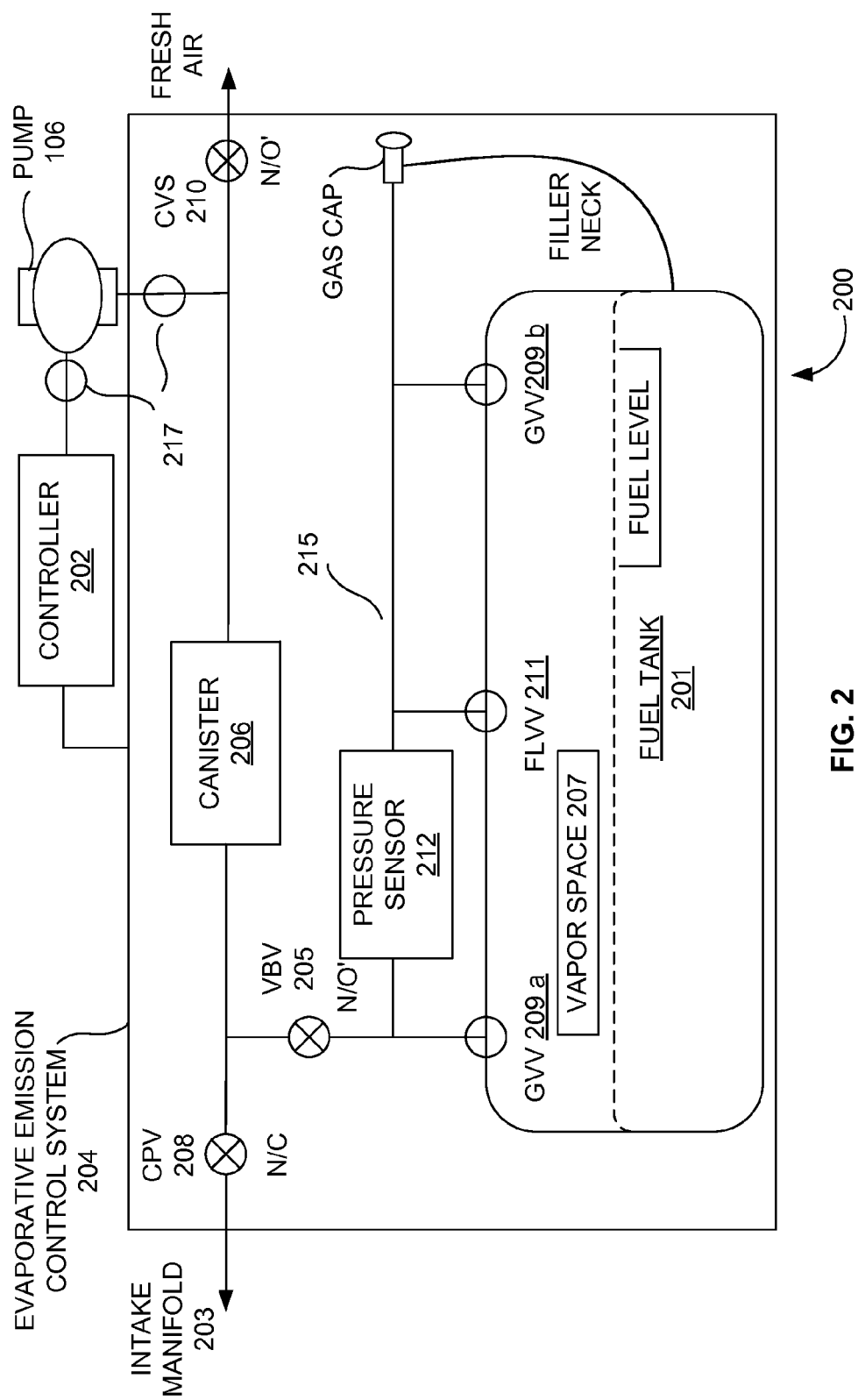
FIG. 2 illustrates a combined leak detection and tire inflation system according to one embodiment of the present disclosure.

FIG. 2 illustrates a combined evaporative emission control system leak detection and tire inflation system 200 according to one embodiment of the present disclosure. The system is mounted in an automotive vehicle that includes a gas tank 201 and an internal combustion engine (not shown). An evaporative emission control system 204 includes a canister 206, which captures and holds fuel vapor. A controller 202 and a series of valves, explained in more detail below, controls the flow of vapor.

Evaporative emission control system 204 captures fuel vapor produced during normal diurnal temperature cycling, feeding captured fuel vapor to the engine intake manifold 203. It will be readily understood that vapor forms in the fuel tank in the vapor space 207 above the fuel level, as shown. It will also be understood that as the temperature within the fuel tank rises, additional liquid fuel vaporizes, raising the pressure within the vapor temper. Previously, the additional vapor would be granted to the atmosphere, producing atmospheric pollution. Here, canister 206 is provided to capture such paper, and the canister is provided with charcoal elements (not shown) which can absorb significant volumes of fuel vapor. A series of valves are positioned in the upper surface of fuel tank 201, namely grade vent valves (GVV) 209 *a* and 209 *b.*, and float level vent valve (FLVV) 211, allowing excess fuel vapor to escape into vapor lines 215. A normally open vapor bypass valve (VBV) 205 connects the vapor lines 215 to canister 206, allowing vapor to flow from the vapor space 207. A pressure sensor 212 monitors the pressure level in vapor space 207, ensuring that VBV 205 is open when vapor space pressure rises above a predetermined level.

Conventional operation of canister 206 draws accumulated fuel vapor out of that receptacle by closing VBV 205 and opening a canister purge valve 208, positioned in a vapor line between canister 206 and intake manifold 203. The canister vent solenoid (CVS) 210 opens the upstream side of the canister to a flow of fresh air, and the resulting airflow sweeps the fuel vapor toward and then into intake manifold 203. When sufficient time has elapsed to completely purge fuel vapor from canister 206, controller 202 can close CPV 208 and CVS 210 and open CBV 205, returning the system to a mode in which fuel vapor can be accumulated within canister 206.

The carbon elements contained within canister 206 are known in the art they need no further explanation here. Similarly, the components that make up the elements of the evaporative emission control system 204 are likewise known, and those of skill in the art will understand the design choices available, as well as the trade-offs inherent in those choices.

However well the conventional evaporative emission control system 204 might work in a conventional automobile, many modern automobiles, particularly hybrids, having internal combustion and electric prime mover systems, experience problems running an effective purge cycle. Because the internal combustion might only be operating for a short time, the available time may not be sufficient to completely purge captured fuel vapor from the carbon elements of canister 206.

The present disclosure provides an improved canister purging capability by connecting pump 106, from the flat tire repair kit, into the vapor lines 215. Operation of pump 106 in the tire repair mode will be discussed for thoroughly below, but it should be understood that in general, the pump is removably connected to both the 12V power system and the vapor lines 215, as well as via a signal connection to controller 202. In one embodiment, a plug-in device carrying all three connection elements can conveniently and quickly connect pump 106 to the required systems. Those in the art will be able to fashion such connections in a convenient and reliable manner.

Inclusion of pump 106 provides an improved purge capability, as follows. Here, the purge cycle is initiated by controller 202, which closes VBV 205 and CVS 210 and then turns on pump 106. The pump greatly increases airflow through canister 206, ensuring that the carbon elements are thoroughly cleansed of fuel vapor in a short amount of time.

Inclusion of pump 106 in the present disclosure also provides the capability to test the evaporative emission control system for leaks. In this mode, all valves connecting outside the evaporative emission control system 204 are closed—CPV 208 and CVS 210. A simple device to ensure that the fuel tank filler is closed would also be helpful, and such a device is well within the skill of those in the art. Once the system is completely closed, controller 202 can activate pump 106, which immediately pressurizes the entire evaporative emission control system 204. Pressure sensor 212 then takes a number of readings over a predetermined period of time, and controller 202 compares the resulting pressure profile with criteria that indicate whether or not the system is holding pressure for a sufficient time. A typical measure of the minimum size leak being sought is about 0.02 inches, and that size leak can be identified within a maximum of five minutes. The entire process of evaluating the results of the pressure test is set out in connection with FIG. 4.

The embodiment illustrated here provides a "normal" working environment in which the pump 106 remains connected to the evaporative emission control system 204 unless it is specifically removed to function in the flat tire repair kit 102. In an alternate embodiment, however, pump 106 may be retained as part of the flat tire repair kit 102, with the possibility of connecting pump 106 to the evaporative emission control system 204 whenever desired. That embodiment is made possible by quick disconnect devices 217, which allow the pump to be connected to vapor lines 215 and to controller 202 rapidly and conveniently. Connection to the 12V power system may also be made as desired. In this manner, pump 106 can be operated completely independently, employing that device where needed at any particular moment.

Figure 3:
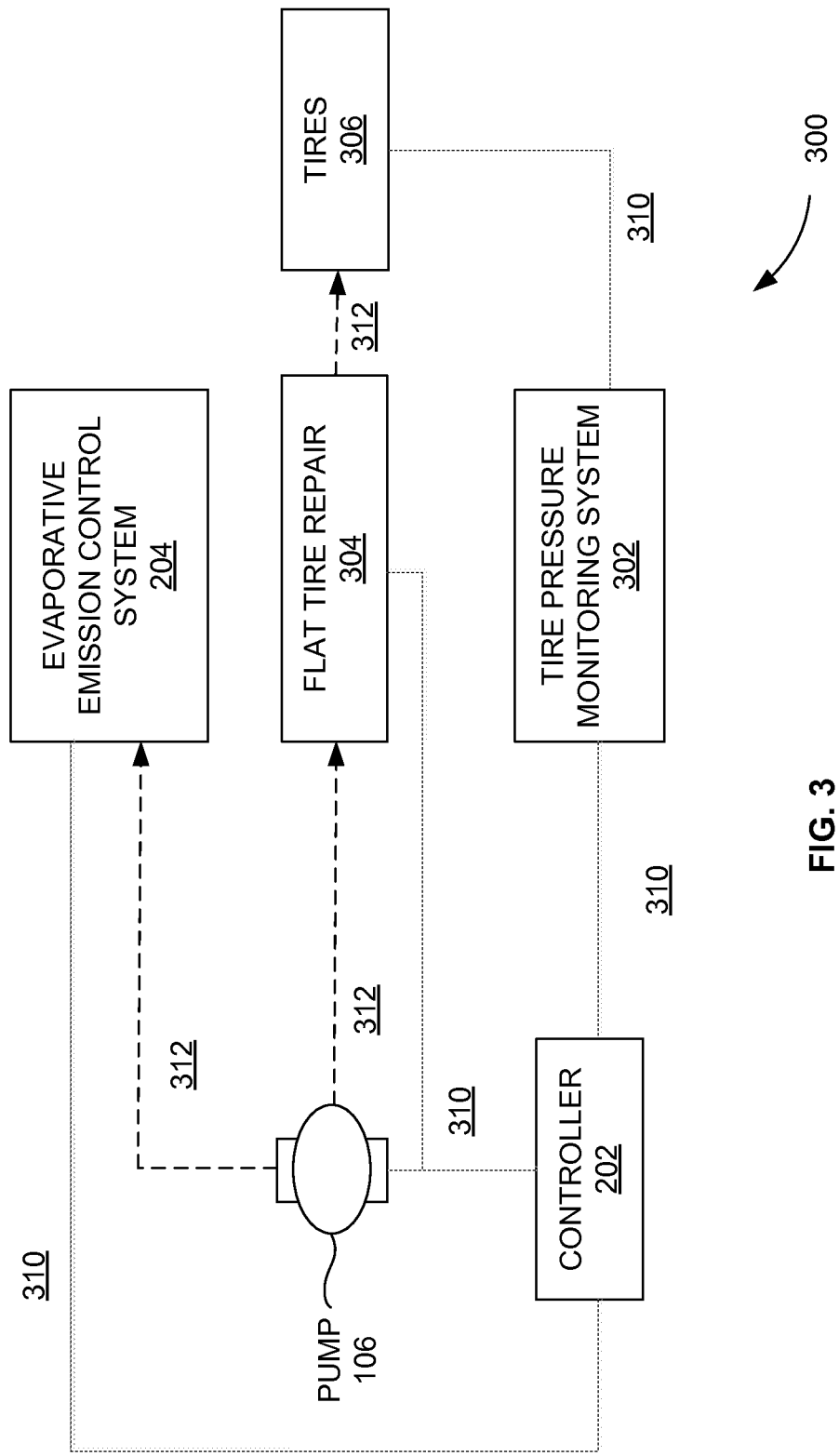
FIG. 3 illustrates a combined leak detection and tire inflation system according to one embodiment of the present disclosure.

FIG. 3 illustrates a combined leak detection and tire inflation system 300, according to one embodiment of the present disclosure. As shown here, pneumatic (air pressure) connections 312 are shown as dashed lines, and electronic signaling connections 312 are shown as solid lines. Thus, pump 106 of FIG. 1 is shown connected by pneumatic lines 312 to the evaporative emission control system 204 and a flat tire repair system 304. Controller 202 is electronically connected to the evaporative emission control system 204, a tire pressure monitoring system 302, and pump 106.

The evaporative emission control system 204 and the pump 106 function here in the same manner as shown in FIG. 2, with the exception that pump 106 is selectively connected to evaporation emission control system 204, as well as to a flat tire repair system 304, made up of sealant reservoir 101 and pneumatic lines 312 extending to each vehicle tire. It will thus be understood that the embodiment of FIG. 3 represents one further step of extension in combining the functioning of both the evaporative emission control system 204 and an improved system for repairing flat tires.

Tire pressure monitoring system 302 is known in the art, but only in a standalone mode, generally implemented on trucks. As is known in the art, tire pressure monitoring requires an air pressure connection to each tire, as well as an air pressure sensor capable of monitoring pressure in each tire. Such systems have proved useful in monitoring tire pressure on an ongoing basis and warning the driver when additional air pressure is required. In some implementations, a compressor is integrated into the system, providing the capability of increasing tire pressure on the fly.

As implemented here, pump 106 is adapted either to provide additional air pressure or to inject an aerosol sealant 101 into a tire. This capability fills an unmet need in tire pressure monitoring systems, in that conventional systems can warn the driver that tire pressure is going low, but in the event of a puncture or serious leak, the system provides information but not solutions. The illustrated embodiment, adds the capability of action to repair a flat tire to the ability simply to watch the pressure disappear.

In the event that tire monitoring system 302 detects a serious leak or flat tire, that information is fed to controller 202, which initiates a flat tire repair sequence. The identity of the flat tire is fed to pump 106 and flat tire repair system 304. The latter system selects pneumatic line 312 connected to the affected tire, and pump 106 commences inflating that tire with sealant. In some embodiments, where a given tire is low but not flat, flat tire repair system 304 connects appropriate pneumatic line 312 directly to the pump 106, rather than to the ceiling can 101, allowing the system to pump air, rather than sealant, to a tire.

It should be noted that leak detection operation operates exactly as discussed above.

Figure 4:
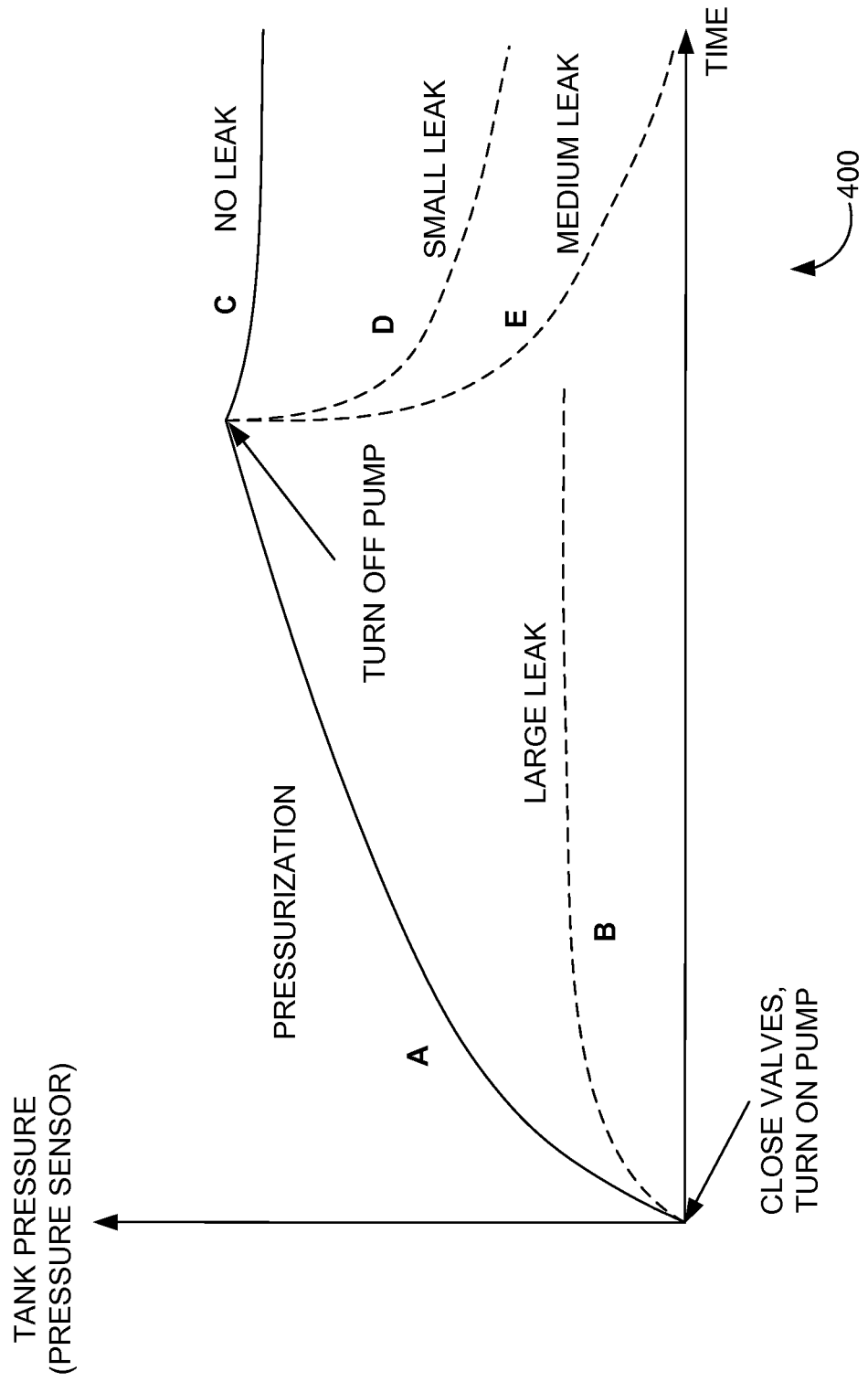
FIG. 4 is a graphical representation of a fuel tank pressure profile according to one embodiment of the present disclosure.

FIG. 4 is a graphical representation 400 of a system pressure profile according to one embodiment of the present disclosure. Here, system pressure means the ambient pressure in the compressible fluid portion of the system, such as vapor space 207 (FIG. 2). The graphical representation indicates the system pressure on the y-axis and the time on the x-axis. A leak in the evaporative emission control system 204 may be diagnosed by pressurizing the evaporative emission control system 204 and commencing a series of pressure readings, as set out above. The initial stage of the leak test process is represented by curves A and B emanating from the 0, 0 point. If a large system leak exists, of course, the pump will never pressurize the system, as represented by curve B, where system pressure rises slightly but remains at a very low level. Thus, failure to pressurize at all indicates a large leak Pump 106 remains on until system pressure reaches a desired point, at which time the pump is turned off. Controller 202 and the pressure sensor to want to continue taking measurements for a predetermined time, which could be up to five minutes to ensure that leaks down to a size of about 0.02 inches are detected. The resulting pressure curve is then compared against leak criteria. In one embodiment, pressure readings are only taken at the turnoff point and the end of the measurement time, because the endpoint of the measurement rather than the shape of the curve is the relevant standard. Depending on how far the pressure has fallen the system can be classified as having little to no leakage, as shown by curve C; a small leak, as shown by curve D; or a medium leak, as shown by curve E. It will be noted that a large leak is characterized by the system never reaching the desired pump turnoff level.

In the event that the leak test indicates some result of the no leak, the system can provide a warning to that effect. Such warnings can take any of the variety of forms available to and known to the art. In one embodiment, the system may employ warning lights, which can be colored LED's, of a green light for no leak, a yellow light for a small leak, and a red light for a medium or large leak. Other forms of warning, such as an audible alarm for larger medium leeks, for example are readily implemented.

Leakage testing can be carried out on a scheduled basis in some embodiments, or the process can be left to the user to initiate. In either event, some mechanism for alerting the user to the fact that a leak test has been run should be provided, allowing for the possibility of a problem determination.

The foregoing description of the specific embodiments will so fully reveal the general nature of the embodiments that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed is for the purpose of description and not of limitation. Therefore, while the embodiments have been described in terms of preferred embodiments, those skilled in the art will recognize that the embodiments can be practiced with modification within the spirit and scope of the appended claims.

What is claimed is:

1. A combined evaporative emission control system leak detection and tire inflation system for an automotive vehicle having an internal combustion engine and a fuel tank, comprising:
    an evaporative emission control system, including:
        a canister, in fluid communication with a fuel tank and an engine;
        a canister purge valve (CPV), interposed in a communication line between the canister and an intake manifold of the engine; and
        a pressure sensor, positioned to sense vapor pressure in the evaporative emission control system;
    a flat-tire repair kit, including
        a reservoir containing a tire inflation fluid and
        an attachment tube extending from the reservoir and adapted for connection to a tire on the vehicle; and
        a pump in fluid communication with the evaporative emission control system and the reservoir; and
    a controller, configured to
        initiate a leak detection sequence;
        pressurize the evaporative emission control system;
        measure the evaporative emission control system pressure over a selected period of time; and
        upon a determination that the evaporative emission control system pressure falls below a preselected threshold within a preselected time, provide a warning of an evaporative emission control system leak.

2. The combined evaporative emission control system leak detection and tire inflation system of claim 1, wherein the controller is configured to control the pump.

3. The combined evaporative emission control system leak detection and tire inflation system of claim 2, wherein the pump is configured to be connected to, and disconnected from the controller, a power line, and a pneumatic interface to the evaporative emission control system.

4. The combined evaporative emission control system leak detection and tire inflation system of claim 3, wherein the controller is further configured to provide an indication to reconnect the pump to the controller when the pump is disconnected from the controller.

5. A combined evaporative emission control system leak detection and tire inflation system for an automotive vehicle, comprising:
    an evaporative emission control system, including:
        a canister, in fluid communication with a fuel tank and an engine;
        a canister purge valve (CPV), interposed in the communication line between the canister and an intake manifold of the engine; and
        a pressure sensor, positioned to sense vapor pressure in the evaporative emission control system;
    a flat-tire repair kit, including
        a reservoir containing a tire inflation fluid;
        an attachment tube extending from the reservoir and adapted for connection to a tire on the vehicle; and
        a pump in fluid communication with the evaporative emission control system and the reservoir; and
    a controller, configured to initiate a leak detection sequence;
        pressurize the evaporative emission control system;
        measure the evaporative emission control system vapor pressure over a selected period of time; and
        upon a determination that the evaporative emission control system vapor pressure falls below a preselected threshold within a preselected time, provide a warning of a possible evaporative emission control system leak,
    wherein the pump is configured to pressurize the evaporative emission control system, and
        to cease operation if a leak is detected in the evaporative emission control system.

6. The combined evaporative emission control system leak detection and tire inflation system of claim 5, wherein the preselected time for monitoring vapor pressure within the evaporative emission control system is five minutes.

7. The combined evaporative emission control system leak detection and tire inflation system of claim 6, wherein the pump is configured to be connected to, and disconnected from the controller, a power line, and a pneumatic interface to the evaporative emission control system.

8. A system for an automotive vehicle, comprising:
    an evaporative emission control system including:
        a canister, in fluid communication with a fuel tank and an engine;
        a canister purge valve, interposed in the communication line between the canister and an intake manifold of the engine; and
        a pressure sensor, positioned to sense vapor pressure in the evaporative emission control system;
    a flat-tire repair system, including
        a reservoir containing a tire inflation fluid and
        an attachment tube extending from the reservoir and adapted for connection to each tire on the vehicle; and
        a pump in fluid communication with the evaporative emission control system and the reservoir;
    a controller, configured to
        perform a leak detection sequence, including
            pressurizing the evaporative emission control system;
            measuring the evaporative emission control system vapor pressure over a selected period of time; and
            upon a determination that the evaporative emission control system vapor pressure falls below a preselected threshold within a preselected time, providing a warning of an evaporative emission control system leak; and upon a determination that a vehicle tire is flat, initiate a tire inflation sequence, including signaling the flat tire repair kit the identity of the tire requiring inflation and signaling the pump to commence operation;

a tire pressure monitoring system, in fluid communication with the vehicle tires and operatively connected with the controller.

9. The system of claim 8, wherein the controller is further configured, upon a determination that a vehicle tire pressure is low, to initiate a tire pressurization sequence, including signaling the flat tire repair system the identity of the tire requiring inflation and signaling the pump to commence operation.

10. The system of claim 8, wherein the tire pressure monitoring system is configured to continuously monitor pressure in each vehicle tire.

11. The system of claim 10, wherein the pump is configured to pressurize the evaporative emission control system, and wherein the pump is turned off when a leak in the fuel supply is detected.

12. A system for an automotive vehicle, comprising:
an evaporative emission control system including:
  a canister, in fluid communication with a vehicle fuel tank and engine;
  a canister purge valve, interposed in the communication line between the canister and an intake manifold of the engine; and
  a pressure sensor, positioned to sense vapor pressure in the evaporative emission control system;
a flat-tire repair system, including
  a reservoir containing a tire inflation fluid and
  an attachment tube extending from the reservoir and adapted for connection to each tire on the vehicle; and
  a pump in fluid communication with the evaporative emission control system and the reservoir;
a controller, configured to perform a leak detection sequence, including
  pressurizing the evaporative emission control system;
  measuring the evaporative emission control system vapor pressure over a selected period of time; and
  upon a determination that the evaporative emission control system vapor pressure falls below a preselected threshold within a preselected time, providing a warning of an evaporative emission control system leak;
perform a system purge sequence, including
  closing a vapor bypass valve to isolate the gasoline tank from the evaporative emission control system;
  opening the canister purge valve; and
  operating the pump to create an airflow through the canister and into the intake manifold; and
upon a determination that a vehicle tire is flat, initiate a tire inflation sequence, including signaling the flat tire repair kit the identity of the tire requiring inflation and signaling the pump to commence operation;
a tire pressure monitoring system, in fluid communication with the vehicle tires and operatively connected with the controller.

13. The system of claim 12, wherein the controller is further configured, upon a determination that a vehicle tire pressure is low, to initiate a tire pressurization sequence, including signaling the flat tire repair system the identity of the tire requiring inflation and signaling the pump to commence operation.

14. The system of claim 12, wherein the tire pressure monitoring system is configured to continuously monitor pressure in each vehicle tire.

15. The system of claim 1, wherein the attachment tube is fixedly connected to each vehicle tire.

16. The system of claim 5, wherein the attachment tube is fixedly connected to each vehicle tire.

17. The system of claim 8, wherein the attachment tube is fixedly connected to each vehicle tire.

18. The system of claim 12, wherein the attachment tube is fixedly connected to each vehicle tire.

* * * * *